United States Patent
Lopez

(10) Patent No.: US 12,483,559 B2
(45) Date of Patent: Nov. 25, 2025

(54) SYSTEMS AND METHODS FOR GRANTING ACCOUNT ACCESS TO A GUEST CONTACT

(71) Applicant: Capital One Services, LLC, McLean, VA (US)

(72) Inventor: Jennifer Lopez, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 230 days.

(21) Appl. No.: 17/811,107

(22) Filed: Jul. 7, 2022

(65) Prior Publication Data

US 2024/0015158 A1 Jan. 11, 2024

(51) Int. Cl.
*H04L 9/40* (2022.01)

(52) U.S. Cl.
CPC .......... *H04L 63/102* (2013.01); *H04L 63/108* (2013.01)

(58) Field of Classification Search
CPC ..... H04L 63/102; H04L 63/108; H04L 63/10; H04L 63/0853; G06F 21/42; G06F 21/31; G06F 21/6218; G06F 2221/2113; H04W 12/08
See application file for complete search history.

(56) References Cited

U.S. PATENT DOCUMENTS

| | | | |
|---|---|---|---|
| 8,943,096 B2 | 1/2015 | White | |
| 9,374,607 B2 | 6/2016 | Bates et al. | |
| 9,473,504 B2 * | 10/2016 | Sundaresan | H04L 63/102 |
| 10,003,591 B2 | 6/2018 | Hockey et al. | |
| 11,108,781 B2 | 8/2021 | Kumaraswamy | |
| 11,343,239 B2 * | 5/2022 | Dunjic | G06F 9/451 |
| 2005/0228680 A1 * | 10/2005 | Malik | H04L 51/04 705/26.1 |
| 2005/0268107 A1 * | 12/2005 | Harris | H04L 63/0853 713/182 |
| 2009/0031131 A1 * | 1/2009 | Qiu | H04L 63/0442 713/172 |

(Continued)

OTHER PUBLICATIONS

Huntington Access Sharing User Guide, Huntington, 2020, https://www.huntington.com/-/media/pdf/delegate-access-user-guide.pdf?rev=82bbb2338535469681233f6e45fc1008 [retrieved on Jan. 21, 2022]. Retrieved from the Internet (6 pages).

*Primary Examiner* — Jung W Kim
*Assistant Examiner* — James P Moles
(74) *Attorney, Agent, or Firm* — Bookoff McAndrews, PLLC

(57) ABSTRACT

Disclosed are methods and systems for granting a guest contact account access. For instance, a request to grant account access to a guest contact that includes guest contact information and account access permission(s) may be received from a first application executing on a first device of an account managing contact. An account session for the guest contact may be generated based on the request, and an electronic communication including a link to provide account session access may be generated and transmitted to a second device of the guest contact. A second application may be opened on the second device upon link selection, where a user interface thereof includes an identity verification prompt. Upon verification, the account session may activate to provide the guest contact account access through the second application. The guest contact's account access may then be revoked based on a determination of an account session termination event occurring.

19 Claims, 5 Drawing Sheets

(56) References Cited

U.S. PATENT DOCUMENTS

| | | | |
|---|---|---|---|
| 2009/0222878 A1* | 9/2009 | Walsh | G06F 21/6218 |
| | | | 726/1 |
| 2012/0278216 A1 | 11/2012 | Evans et al. | |
| 2013/0067594 A1* | 3/2013 | Kantor | G06F 16/9566 |
| | | | 726/28 |
| 2013/0150097 A1* | 6/2013 | Chou | H04W 4/08 |
| | | | 455/566 |
| 2015/0026024 A1* | 1/2015 | Calman | G06Q 40/02 |
| | | | 705/35 |
| 2015/0039759 A1* | 2/2015 | Kuo | H04L 67/02 |
| | | | 709/225 |
| 2018/0150650 A1* | 5/2018 | Saunders | H04L 63/104 |
| 2018/0343261 A1* | 11/2018 | Lopez-Uricoechea | H04L 63/126 |
| 2020/0106764 A1* | 4/2020 | Hockey | H04L 9/3228 |
| 2021/0081947 A1* | 3/2021 | Hockey | H04L 63/0838 |
| 2022/0138842 A1* | 5/2022 | Drucker | G06Q 20/4016 |
| | | | 705/44 |
| 2022/0141212 A1* | 5/2022 | Kumar | H04L 63/0807 |
| | | | 726/4 |
| 2022/0164075 A1* | 5/2022 | Kirigin | G06F 16/9535 |
| 2022/0164484 A1* | 5/2022 | Low | H04W 4/90 |
| 2022/0248072 A1* | 8/2022 | Gupta | H04L 63/0807 |
| 2024/0012919 A1* | 1/2024 | Malden | G06F 21/62 |

* cited by examiner

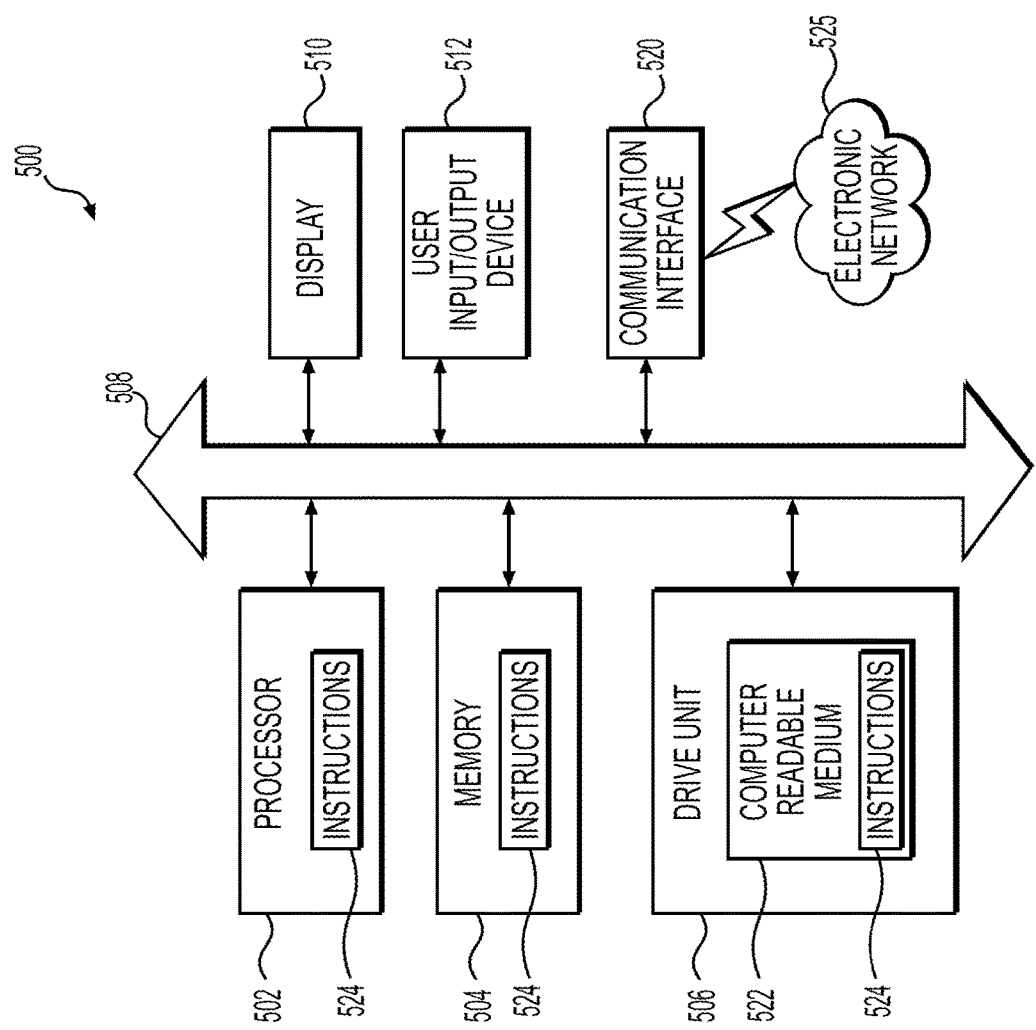

SYSTEMS AND METHODS FOR GRANTING ACCOUNT ACCESS TO A GUEST CONTACT

TECHNICAL FIELD

Various embodiments of this disclosure relate generally to techniques for granting account access to a guest contact, and, more particularly, to systems and methods for granting account access via a modifiable and/or revocable, permissions-based account session that is accessible without the sensitive account credentials being shared and/or the guest contact having to establish a new or separate account or establish credentials unique to the guest contact for the account.

BACKGROUND

Online accessible accounts, particularly finance-related accounts, often require account owners to establish and provide login credentials, such as a username and password, in order to access the account. In some circumstances, an account owner may desire for an individual other than themselves (e.g., a non-owner or guest) to have access to and/or act on their behalf to perform particular tasks associated with the account. For example, a bank account owner may be ill and desire for a family member to transfer money from the bank account to pay a credit card balance on their behalf. However, to enable the non-owner or guest access to the account, the account owner may be limited to sharing their sensitive login credentials, which puts the account owner at risk for financial misuse.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for granting account access to a guest contact. The methods and systems may enable granting of account access via a modifiable and/or revocable, permissions-based account session that is accessible by the guest contact without the account credentials being shared and/or the guest contact having to establish a new or separate account or establish credentials unique to the guest contact for the account.

For instance, a computer-implemented method for granting account access to a guest contact may include receiving, from a first application executing on a first device, a request from a managing contact of an account to grant a guest contact access to the account. The request may include contact information for the guest contact and one or more permissions associated with the access to the account by the guest contact. The method may also include generating an account session for the guest contact based on the contact information and the one or more permissions, generating a first electronic communication that includes a link to provide the guest contact access to the account session, transmitting the first electronic communication to a second device of the guest contact, and causing a second application to open on the second device upon a selection of the link, where a user interface of the second application may include a prompt for identity verification. The method may further include, upon identify verification, activating the account session to provide the guest contact access to the account through the second application, determining an occurrence of a termination event associated with the account session, and revoking the guest contact's access to the account based on the determination.

A system for granting account access to a guest contact may include at least one memory storing instructions, and at least one processor operatively connected to the at least one memory and configured to execute the instructions to perform operations. The operations may include receiving, from a first application executing on a first device, a request from a managing contact of an account to grant a guest contact access to the account. The request may include contact information for the guest contact and one or more permissions associated with the access to the account by the guest contact. The operations may also include generating an account session for the guest contact based on the contact information and the one or more permissions, generating a first electronic communication that includes a link to provide the guest contact access to the account session, transmitting the first electronic communication to a second device of the guest contact, and causing a second application to open on the second device upon a selection of the link, where a user interface of the second application may include a prompt for identity verification. The operations may further include, upon identify verification, activating the account session to provide the guest contact access to the account through the second application, determining an occurrence of a termination event associated with the account session, and revoking the guest contact's access to the account based on the determination.

A computer-implemented method for granting account access to a guest contact may include receiving, from a first application executing on a first device, a request from a managing contact of an account to grant a guest contact access to the account. The request may include contact information for the guest contact and one or more permissions associated with the access to the account by the guest contact. The method may also include generating an account session for the guest contact based on the contact information and the one or more permissions, generating a first electronic communication that includes a link to provide the guest contact access to the account session, transmitting the first electronic communication to a second device of the guest contact, and causing a second application to open on the second device upon a selection of the link, where a user interface of the second application may include a prompt for identity verification. The method may further include, upon identify verification, activating the account session to provide the guest contact access to the account through the second application, receiving, from the second application, activity data associated with the account session, providing the activity data to the first application for display, where the activity data may be displayed on a user interface of the first application along with one more controls for one or more of modifying the one or more permissions or terminating the account session, determining an occurrence of a termination event associated with the account session, and revoking the guest contact's access to the account based on the determination.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts an example of a computer, according to certain embodiments.

DETAILED DESCRIPTION OF EMBODIMENTS

Figure 1:
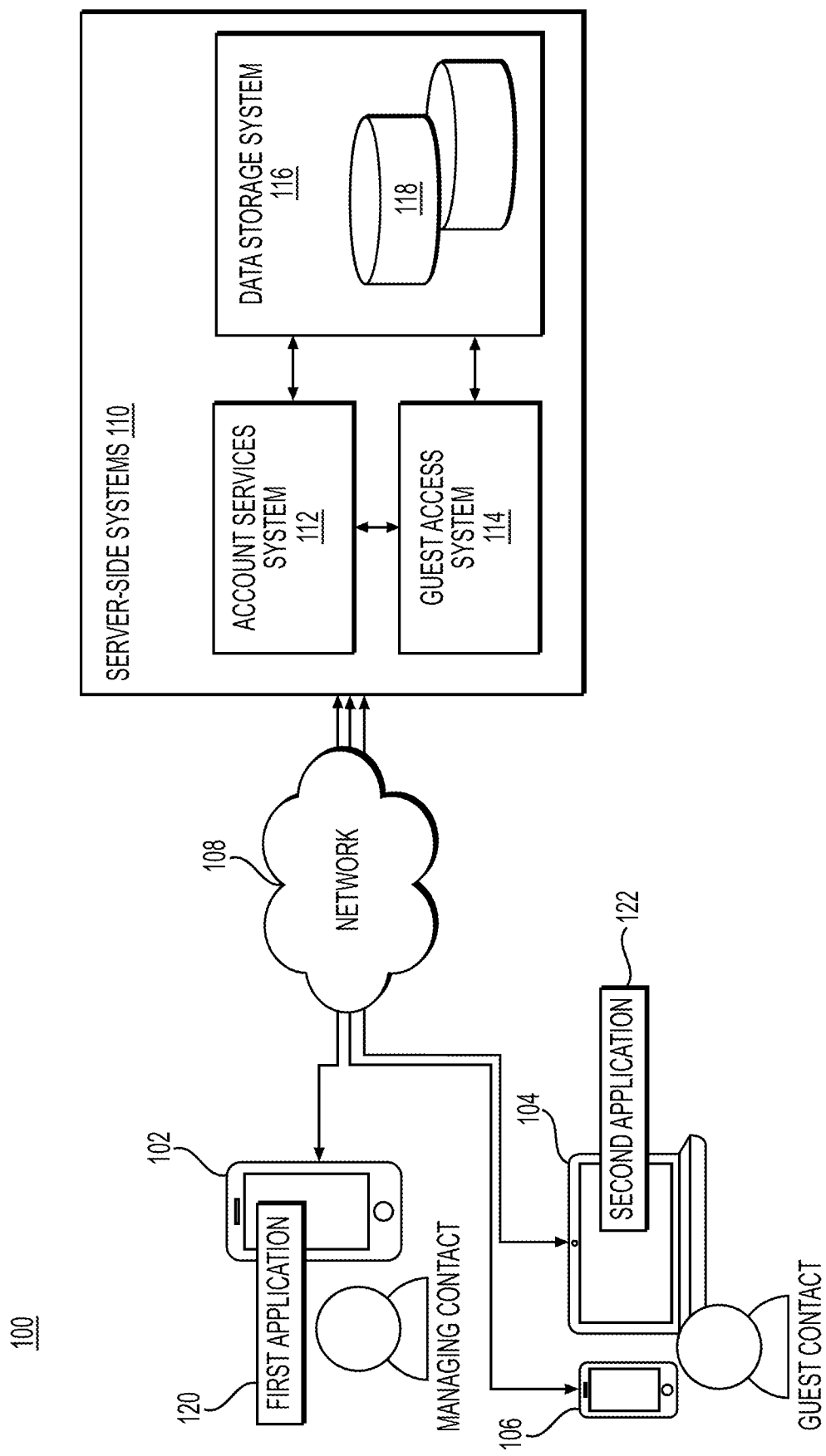
FIG. 1 depicts an exemplary environment for granting account access to a guest contact, according to certain embodiments.

According to certain aspects of the disclosure, methods and systems are disclosed for granting account access to a guest contact.

As will be discussed in more detail below, in various embodiments, systems and methods are described for generation of an account session that is accessible by a guest contact in response to receiving a grant access request from a managing contact of the account (e.g., the account owner) and verifying an identity of the guest contact. The account session may be accessible by the guest contact without the account credentials of the managing contact being shared and/or the guest contact having to establish a new or separate account or establish credentials unique to the guest contact for the account. Account-related actions that can be performed by the guest contact via the account session and the duration thereof may be controlled by modifiable permissions set by the managing contact. Additionally, independent from the permissions, the account session may be terminated (e.g., causing the guest contact's access to be revoked) at any time by the managing contact and/or the guest contact.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "account managing contact", "managing contact", "account owner" or "owner" generally encompass any person or entity that may have an account and consume account services from a provider, including online account services through an application, for example. As used herein, terms like "account guest contact", "guest contact", "guest" or "non-owner" generally encompass any person or entity that may be granted access to and given particular permissions for interacting with an account that is owned by another person or entity (e.g., an account managing contact) and provided by a provider, where the access may be online access provided via an application. The term "application" may be used interchangeably with other terms like "program," or the like, and generally encompasses software that is configured to interact with, modify, override, supplement, or operate in conjunction with other software.

In an exemplary use case, certain embodiments may be performed for enabling a managing contact of an account (e.g., an account owner) to grant account access to a non-owner, guest contact for a limited time and purpose without the managing contact having to share their unique account login credentials with the guest contact and bear the potential risk of financial misuse, and without the guest contact having to establish a new or separate account and/or establish credentials unique to the guest contact for the account. For example, the account may be accessible via an application associated with a provider of the account. To grant account access to the guest contact, the managing contact may log into the account using their unique login credentials via the application and submit a request to grant access to the guest contact through the application. Contact information for the guest contact may be automatically extracted from a contacts list of the device on which the application is executing and/or may be manually entered by the managing contact as part of the request. As part of the request, the managing contact may also be prompted to provide permissions, such as a type of access permitted (e.g., read and/or write in association with one or more particular actions/tasks), a duration of access (e.g., 1 hour, 1 day, etc.), and/or a number of accesses allowed (e.g., 1 access, unlimited access for the duration, etc.). An account session constrained by the permissions may then be generated to ensure that the guest contact is limited to acting on behalf of the managing contact in accordance with the permissions set by the managing contact.

To provide the guest contact access to the account session, an electronic communication may be generated (e.g., populated with the contact information) and transmitted to a device of the guest contact. The electronic communication may include a link to provide the guest contact access to the account. When the guest contact selects that link, an instance of the application associated with the account provider may open on the guest contact's device, and a user interface of the application may include a prompt for identity verification. The verification process may include a generation and transmission of another electronic communication to a same or different device of the guest contact (e.g., may include multi-factor authentication). Upon verifying the guest contact's identity, the account session may be activated and the guest contact provided access to the account via the instance of the application opened on the guest contact's device. The account session activity of the guest contact may be tracked and provided to the managing contact. The parameters of the guest contact's access may be modified by the managing contact (e.g., via modifying permissions) and/or access may be altogether revoked by the managing contact (e.g., via a termination request) at any time throughout the duration of the account session. Additionally, the guest contact's access may be revoked upon detecting an occurrence of one or more other types of termination events. For example, in addition to a termination request received from the managing contact, other example termination events may include a termination request received from the guest contact, a closure of the application on the guest contact's device (e.g., if permissions limit the guest contact to 1 access), and/or an expiry of a time period for access defined by the permissions. Revocation prevents the guest contact from re-gaining access to the account until they are given new access (e.g., until a new request to grant access to the guest contact is received from the managing contact).

While specific examples included throughout the present disclosure involve finance-related accounts and services, it should be understood that techniques according to this disclosure may be adapted to other types of accounts and associated services. For example, the techniques may be adapted to any account and associated service for which an account owner desires to grant limited or controlled account access to a non-owner, guest to enable the guest to act on behalf of the account owner. It should also be understood that the examples above are illustrative only. The techniques and technologies of this disclosure may be adapted to any suitable activity.

FIG. 1 depicts an exemplary environment 100 for granting account access to a guest contact, according to certain embodiments, and which may be used with the techniques presented herein. A first device 102, a second device 104, and/or a third device 106 may be computing devices that communicate with one or more of the other components of the environment 100 across electronic network 108, including one or more server-side systems 110 associated with an account provider, discussed below. The first device 102 may be associated with a managing contact that has an account with and consumes account services of the account provider (e.g., the managing contact is the account owner). The second device 104 and/or third device 106 may be associated with a guest contact whom the managing contact desires to grant account access to in order for the guest contact to perform one or more account-related actions or tasks on behalf of the managing contact.

The server-side systems 110 may include an account services system 112, a guest access system 114, and/or a data storage system 116, among other systems. In some embodiments, the account services system 112, the guest access system 114, and the data storage system 116 may be associated with a common entity, e.g., the account provider, or the like. In such embodiments, the account services system 112, guest access system 114, and/or data storage system 116 may be part of a cloud service computer system (e.g., in a data center). In other embodiments, one or more of the components of the environment 100 may be associated with a different entity than another. For example, the guest access system 114 may be associated with a third party that provides guest access services to the account provider and/or the data storage system 116 may be associated with a same or different third party that provides data storage services to the account provider. The systems and devices of the environment 100 may communicate in any arrangement. As will be discussed herein, systems and/or devices of the environment 100 may communicate in order to enable granting of account access to the guest contact, among other activities.

The first device 102, second device 104, and/or third device 106 may be configured to enable the managing contact or guest contact, respectively, to access and/or interact with other systems in the environment 100. For example, the first device 102, second device 104, and/or third device 106 may be a computer system such as, for example, a desktop computer, a laptop computer, a tablet, a smart cellular phone (e.g., a mobile phone), a smart watch or other electronic wearable, etc. As one non-limiting example illustrated in FIG. 1, the first device 102 may be a smart cell phone of the managing contact, the second device 104 may be a laptop computer of the guest contact, and the third device 106 may be a smart cell phone of the guest contact.

In some embodiments, the first device 102, second device 104, and/or third device 106 may include one or more electronic application(s), e.g., a program, plugin, browser extension, etc., installed on a memory of the respective devices. The electronic application(s) may include one or more of system control software, system monitoring software, software development tools, etc. In some embodiments, the electronic application(s) may be associated with one or more of the other components in the environment 100. For example, one or more of the electronic application(s) may include client applications associated with one or more of the server-side systems 110 (e.g., a client application of the account provider). In some examples, one or more of the client applications may include thick client applications that are locally installed on the respective devices (e.g., desktop applications or mobile applications). In other examples, one or more of the client applications may include thin client applications (e.g., web applications) that are rendered via a web browser launched on the respective devices.

For example, and as shown in FIG. 1, at least a portion of one or more instructions stored in a memory of the first device 102 may include instructions for executing a first application 120 associated with the account provider (e.g., a client application of the account provider) that is configured to communicate with one or more of the server-side systems 110, including at least account services system 112. As one illustrative example, the first application 120 may be executed on the first device 102 to establish an account session for the managing contact via the account services system 112 (e.g., utilizing services provided by the account services system 112). The managing contact may submit a request via the first application 120 to grant account access to the guest contact, among other tasks performed during the account session, as described elsewhere herein. While the first application 120 is shown as executing on the first device 102 in FIG. 1, the first application 120 may be any instance of the account provider's client application that is associated with the managing contact, and thus may be executed on any device of the managing contact (e.g., upon provision of the managing account credentials).

Additionally, at least a portion of one or more instructions stored in a memory of the second device 104 (as shown) and/or a memory of the third device 106 may include instructions for executing a second application 122 that, similar to the first application 120, is associated with the account provider (e.g., is a client application of the account provider) and configured to communicate with one or more of the server-side systems 110, including at least account services system 112. As one illustrative example, the second application 122 may be executed on the second device 104 to provide the guest contact access, via the account services system 112, to an account session that is generated for the guest contact (e.g., by guest access system 114) in response to receiving the request from the managing contact to grant account access to the guest contact. In some examples, the second application 122 may have the same features and functionalities as the first application 120. In other examples, the second application 122 may be limited to a subset of the features and functionalities of the first application 120 (e.g., limited based on account session permissions described elsewhere herein). While the second application 122 is shown as executing on the second device 104 in FIG. 1, the second application 122 may be any instance of the account provider's client application that is associated with the generated account session for the guest contact, and thus may be executed on any device of the guest contact (e.g., upon identify verification).

Additionally, one or more components of the first device 102, second device 104, and/or third device 106 may generate, or may cause to be generated, one or more graphic user interfaces (GUIs) based on instructions/information stored in the memory, instructions/information received from the other systems in the environment 100, and/or the like and may cause the GUIs to be displayed via a display of the respective devices. The GUIs may be, e.g., mobile application interfaces or browser user interfaces and may include text, input text boxes, selection controls, and/or the like. The display may include a touch screen or a display with other input systems (e.g., a mouse, keyboard, etc.) for the managing contact and/or guest contact of the respective devices to control the functions thereof.

The account services system 112 may include one or more server devices (or other similar computing devices) for executing account services of the provider. For example, through an account session for the managing contact established via the first application 120 executing on the first device 102, the account services system 112 may enable the managing contact to navigate through account details and information, perform account-related actions or tasks (including to request to grant account access to the guest contact), request service assistance from the provider's agents, and/or the like. As another example, through an account session generated for the guest contact (e.g., by guest access system 114) and accessed via the second application 122 executing on the second device 104, the account services system 112 may enable the guest contact to perform account-related actions or tasks as permitted by the managing contact.

The guest access system 114 may include one or more server devices (or other similar computing devices) for executing guest access services. In some examples, the guest access system 114 may be a sub-system or component of the account services system 112. As described in detail elsewhere herein, example guest access services may include processing requests to grant account access to guest contacts (e.g., to obtain contact information and permissions), generating account sessions for the guest accounts that are deployable via the account services system 112 upon guest contact identity verification, verifying identities of guest contacts, monitoring account session activities of the guest contacts, and enabling modifications and/or termination of the guest contact account sessions.

The data storage system 116 may include a server system, computer-readable memory such as a hard drive, flash drive, disk, etc. In some embodiments, the data storage system 116 includes and/or interacts with an application programming interface for exchanging data to other systems, e.g., one or more of the other components of the environment, such as at least the account services system 112 and the guest access system 114. In some examples, the data storage system 116 may be a sub-system or component of the account services system 112. The data storage system 116 may include a plurality of data stores 118. The data stores 118 may include and/or act as a repository or source for various types of account-related data. For example, at least one of the data stores 118 may include data related to guest contact account accesses, such as contact information for the guest contacts, permissions set and/or modified by the managing contacts, guest contact identity verification information, account session activity data, termination events and/or the like.

The network 108 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 108 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. The first device 102, second device 104, and/or third device 106 and one or more of the server-side systems 110 may be connected via the network 108, using one or more standard communication protocols. The first device 102, second device 104, and/or third device 106 and the one or more of the server-side systems 110 may transmit and receive communications from each other across the network 108, as discussed in more detail below.

Although depicted as separate components in FIG. 1, it should be understood that a component or portion of a component in the system of exemplary environment 100 may, in some embodiments, be integrated with or incorporated into one or more other components. For example, the guest access system 114 and/or data storage system 116 may be integrated with the account services system 112 or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the first device 102, second device 104, and/or third device 106, one or more of the server-side systems 110, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
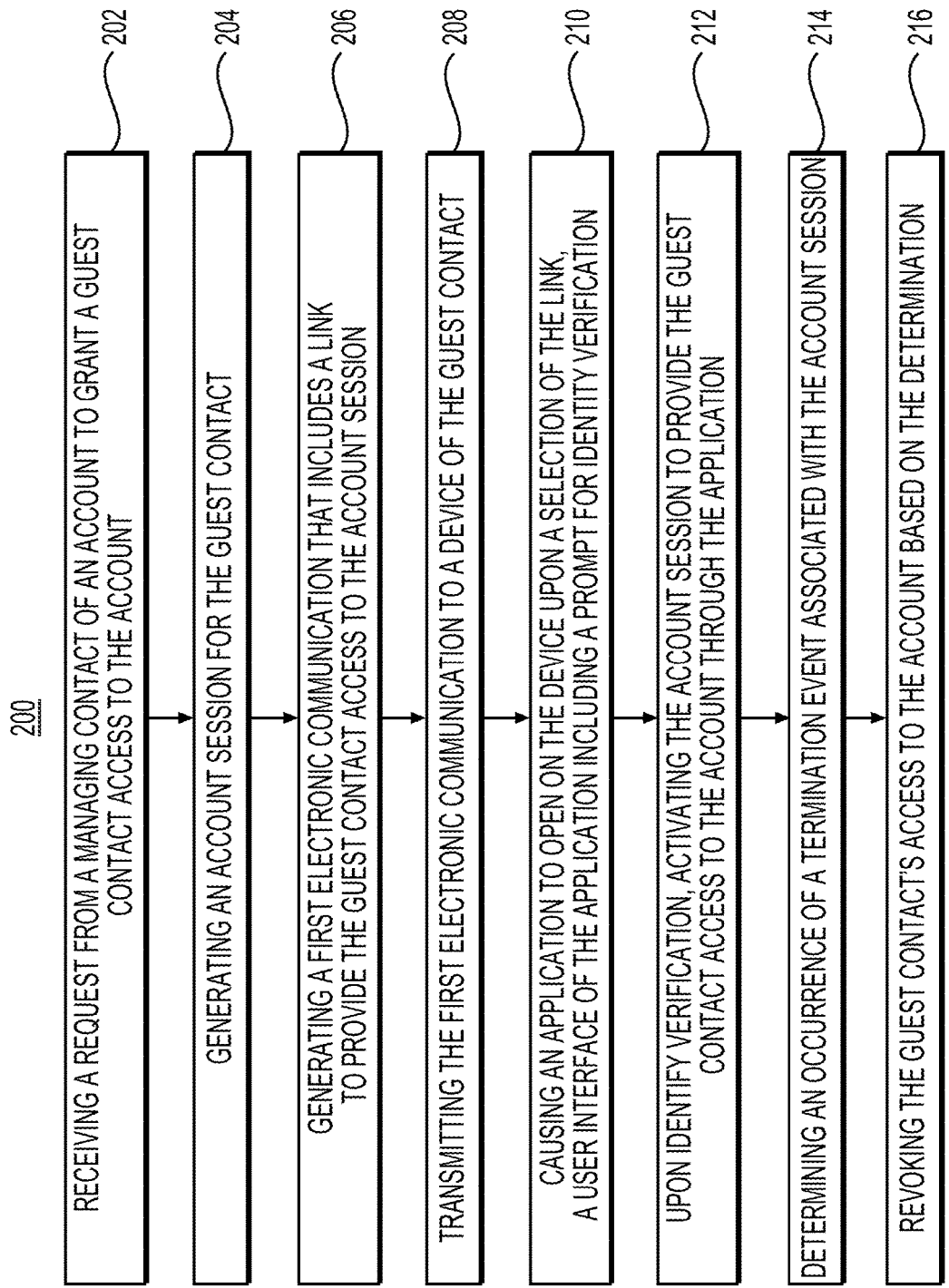
FIG. 2 depicts a flowchart of an exemplary process for granting account access to a guest contact, according to certain embodiments.

FIG. 2 depicts a flowchart of an exemplary process 200 for granting account access to a guest contact, according to certain embodiments. In some examples, the process 200 may be performed by the guest access system 114. At step 202, the process 200 may include receiving a request from a managing contact of an account to grant a guest contact access to the account. The guest access system 114 may receive the request from first application 120 executing on first device 102. For example, the managing contact may open the first application 120 on the first device 102 and provide their unique managing contact credentials to login to the account. Upon login, an account page of the first application 120 may be displayed. The account page may include an option to grant guest access to the account. In response to the option being selected, the request may be received by the guest access system 114 from the first application 120 over network 108, for example.

As part of the request, contact information for the guest contact may be received. The contact information may include a name, one or more telephone numbers, and/or one or more electronic mail addresses of the guest contact, among other similar types of contact information. In some examples, the first application 120 may provide fields associated with each type of contact information to prompt manual entry of the contact information. In other examples, the first application 120 may automatically extract the contact information of the guest contact from a contacts list associated with the first device 102. Automatic extraction of the contact information from the contacts list may result in fewer errors in the contact information as compared to having the managing contact manually enter (e.g., based on memory or by transcribing) the contact information. Such error reduction may be particularly important when the accounts are finance-related or are associated with sensitive information of the managing contact to prevent an unintended, potentially malicious party from gaining access.

In one automatic extraction example, in response to the option to grant guest account access being selected, the first application 120 may display a prompt asking permission for the first application 120 to access the contacts list, and if accepted, the contacts list may be accessed and displayed to enable the managing contact to navigate through and select the guest contact from the contacts list. The information for the selected guest contact may be automatically extracted from the contacts list and provided as part of the request to the guest access system 114. As another automatic extraction example, if the managing contact has opted in or otherwise given permission for the first application 120 to access the contacts list, the first application 120 may display a text field for the managing contact to at least begin entering the guest contact's name. As the managing contact begins to enter text within the text field corresponding to the guest contact's name, the first application 120 may cross-reference the contacts list and provide auto-populated guest contact suggestions for the user to select. Upon a user selection, the contact information for the selected guest contact may be automatically extracted from the contacts list, and provided as part of the request to the guest access system 114. Additionally, or alternatively, when the managing contact selects the option to grant guest account access, a history of past accesses granted to one or more guest contacts may be displayed within a list from which the managing contact can select a guest contact from to re-grant that guest contact access to the account. In such examples, contact information for that guest contact stored in associated with the previous grant of access may be retrieved (e.g., from one of the data stores 118), described further below.

In addition to the request including contact information, the request may also include one or more permissions associated with the access to the account by the guest contact. For example, in response to the managing contact selecting the option, the first application 120 may prompt the managing contact to provide or otherwise indicate the permissions for the guest contact's account access. The permissions may include a type of access, such as read only or read and write, also referred to herein as view only or view and action. The type of access may be specified for each of one or more particular actions or tasks that the guest contact is permitted to perform on behalf of the managing contact (e.g., view account statement and/or perform transfer of funds action). Additionally, the permissions may include a time period allotted for the guest contact to have access (e.g., 20 minutes, 1 hour, 1 day, 1 week, etc.) and/or a number of account accesses (e.g., a particular number of one or more accesses or unlimited accesses within the time period allotted). As one non-limiting, illustrative example, if the provider is a financial institution providing financial accounts, and the user's account with the provider includes one or more banking accounts and a credit card account, the managing contact may allow the guest contact to view a latest statement of the credit card account and act to transfer funds from the banking account to the credit card account in the amount of the balance on the latest statement of the credit card account. The managing contact may allot a time period of one day for the guest contact to access the account session but limit the guest contact to only one access within that one day time period. In some examples, if the guest contact selected or otherwise identified by the managing contact in the request has been previously granted account access, the permissions set by the managing contact for the previous account access may be retrieved from storage (e.g., from one of data stores 118) and provided as default permissions for the present account access for the managing contact to accept and/or modify.

At step 204, the process 200 may include generating an account session for the guest contact. The account session may be generated based on the contact information and the one or more permissions received as part of the request. For example, the guest access system 114 may utilize the permissions indicated by the managing contact to generate the account session such that the account session is constrained or restricted to only allow the guest contact to view and/or perform actions in accordance with the permissions. That is, the account features and functionalities available to the guest contact via the account session generated for the guest contact may be limited. Continuing the above illustrative example, the account session may be generated such that the guest contact is only able to view a latest statement of the credit card account and perform the act of transferring funds from the banking account to the credit card account in the amount of the balance on the latest statement of the credit card account.

At step 206, the process 200 may include generating a first electronic communication that includes a link to provide the guest contact access to the account session. The first electronic communication may be generated as a text message, an electronic mail (e-mail) communication, and/or the like. The link may reference or point to a location of a web application associated with the provider (e.g., the second application 122 as described below). The first electronic communication may also include text indicating that the managing contact has granted the guest contact access to their account and a prompt to select the link to verify their identity and/or access the account. In some examples, the first electronic communication may include an access-specific control element (e.g., an access button) in addition to the link that may provide the guest contact access to the account following identity verification via selection of the link.

At step 208, the process 200 may include transmitting the first electronic communication to a device of the guest contact, such as second device 104 and/or third device 106. As one example, if a text message is generated as the first electronic communication, a telephone number of the third device 106 of the guest contact may be retrieved from the contact information received as part of the request, and used to transmit the text message (e.g., over network 108 or a separate network). In some embodiments, depending on an operating platform of the third device 106, the third device 106 may include a secure chat function that validates the entity (e.g., the account provider) that sent the text message to confirm to the guest contact that the text message was actually sent by the provider (e.g., is not a fraudulent text message). Alternatively, if an e-mail is generated as the first electronic communication, an email of the guest contact may be retrieved from the contact information received as part of the request, and used to transmit the e-mail (e.g., over network 108) such that it is accessible via second device 104 and/or third device 106.

At step 210, the process 200 may include causing an application to open on the device of the guest contact upon a selection of the link, such as the second application 122 on the second device 104. As previously discussed, the link may reference or point to a location of a web application associated with the provider (e.g., the second application 122). Accordingly, upon the guest contact selecting the link within the first electronic communication, an instance of the second application 122 may launch in a web browser, for example, executing on the second device 104. Additionally, in some examples, the guest contact may be provided an option to download (or execute if already installed) a local version of the second application 122 on the second device 104. Initially, the user interface of the second application 122 upon opening may include a prompt for identity verification. For example, the prompt may indicate actions to be performed by the guest contact to verify their identity. In some embodiments, one or more additional steps may be performed by the guest access system 114 to verify the identity of the guest contact, as described elsewhere herein.

At step 212, the process 200 may include activating the account session upon identify verification to provide the guest contact access to the account through the application (e.g., through second application 122). For example, upon identity verification, the guest access system 114 may issue a token and the account session may be activated to provide the guest contact account access through the second application 122. The identity of the guest contact may be verified and the account session activated and accessed without the managing contact having to riskily share their unique managing account credentials with the guest contact, and without the guest contact having to establish a new or separate account of their own with the provider and/or establish credentials unique to the guest contact for the account.

In some examples, upon the identity verification, a page for the account session may be automatically launched and displayed in the second application 122 that is open on the second device 104 (e.g., the account session page may replace the previous user interface including the prompt for identity verification). In other examples, upon the identity verification, the prompt for identity verification within the user interface may be updated to indicate that the guest contact was verified and further direct the guest contact to another means for gaining access to the account when ready to do so, such as via an access-specific control element included along with the link within the first electronic communication. This may be particularly advantageous in instances when, based on the permissions, the guest contact is only allowed one access to the account within an allotted period of time such that the guest contact can access the account when convenient for them to perform the permitted action(s) on behalf of the managing contact. In such instances, the updated prompt may also include the details of the limited number of accesses and a time period within which the limited number of accesses can be made.

Once the account session for the guest contact is activated, a user interface of the first application 120 associated with the managing contact and executing on the first device 102 (or any other device of the managing contact) may visually indicate that the account session for the guest contact is currently active or open. For example, the visual indicator may be displayed within a window, menu, notification, and/or the like on the account page of the first application 120. In some examples, in addition to the visual indicator, the display may include one or more control elements (e.g., buttons, check boxes, radio buttons, etc.) for causing the first application 120 to perform an action associated with the guest contact's account access, and information describing the control elements. Exemplary control elements may include control elements to modify the permissions and/or terminate the account session to revoke the guest contact's access to the account, as described below.

In some embodiments, the guest access system 114 may receive activity data associated with the account session from the second application 122. The activity data may include account-related actions or tasks performed by the guest contact while the account session is active. As it is received, the activity data may be stored (e.g., in one of data stores 118) in association with the account session for the guest contact. Additionally, the activity data may be provided to the first application 120 for display to the managing contact of the account. In some examples, the activity data may be provided to and displayed via the first application 120 in real-time throughout the duration of the guest contact's account session. For example, the activity data may be displayed along with the visual indicator of the account session's active status and/or the one more controls for modifying the permissions and/or terminating the account session. An exemplary user interface of the first application 120 displaying the account session activity data and account session control(s) is described elsewhere herein. In other examples, the activity data may be provided to and displayed via the first application 120 after the account session is terminated.

If a request to modify at least one of the permissions associated with the guest contact's account session is received via the first application 120 (e.g., via a selection and/or input associated with one of the control(s)), the guest access system 114 may modify the account session that is being provided through the second application 122 in accordance with the at least one permission modified. As one illustrative example, initial permissions provided as part of the request may have given the guest contact both read and write access based on at least one of a plurality of actions to be performed by the guest contact on behalf of the managing contact requiring the guest contact to have write access. However, when the managing contact identifies (e.g., based on the activity data) that the guest contact has performed each of the action(s) requiring write access, the managing contact may request to modify the permissions to reduce the guest contact's access to read only for the remaining duration of the account session to perform the remaining actions where read access is sufficient.

Additionally, or alternatively, if a request to terminate the account session is received via the first application 120 (e.g., via a selection and/or input associated with one of the control(s)), the guest access system 114 may proceed to step 214, as described below, to revoke the guest contact's access to the account. As one illustrative example, initial permissions provided as part of the request may have allotted the guest contact a week time period to access the account to perform one or more account-related actions. However, when the managing contact identifies (e.g., based on the activity data) that the guest contact has performed the one or more account-related actions by the end of the first day of the week, the managing contact may request to terminate the account session ahead of the expiry of the initially permitted time period for access.

In some scenarios, after gaining access to the account session via the second application 122, the guest contact may close the second application 122 and/or otherwise exit the account session prior to an expiry of the permitted time period for access or before a permitted number of accesses is reached. In such scenarios, the guest contact may regain access to the account session (e.g., through the link in the first electronic communication). For example, upon a subsequent selection of the link, another instance of the second application 122 may open on a device of the guest contact, such as the second device 104. The user interface of the second application 122 may again include the prompt for identity verification, and, upon identify verification, the guest contact may be provided the access to the account session through the second application 122 as described above (e.g., by reactivating the account session).

At step 214, the process 200 may include determining an occurrence of a termination event associated with the account session. A plurality of termination events may be associated with the account session. One example termination event may occur upon an expiry of a time period for access defined by the permissions. The time period of access may be the initial time period defined by the permissions received as part of the request or a modified time period received subsequent to the generation of the account session (e.g., via a selection and/or input by the managing contact associated with a modify permissions control element that is displayed within a user interface of the first application 120). Additionally, or alternatively, one or more example termination events may occur based on actions performed by the managing contact and/or guest contact via the respective first application 120 and/or second application 122. As one example, a termination event may be determined in response to receiving a request from the managing contact to terminate the account session via the first application 120. For example, as briefly described above, the managing contact may select a control element to terminate the account session that is displayed within a user interface of the first application 120 (e.g., an account page user interface) once the account session is activated.

As another example, a termination event may be determined in response to receiving a request from the guest contact to terminate the account session via the second application. In one example, when a guest contact logouts of the account session (e.g., by selecting a logout control element within a user interface of the second application 122) or otherwise attempts to close the account session, the second application 122 may display a prompt asking if the guest contact would like to terminate the account session to revoke their access to the account. If the guest responds in the positive (e.g., asks to terminate), the termination request may be received by the guest access system 114. In another example, the user interface of the second application 122 may actively display a control element that is selectable by the guest contact to terminate the account session. The guest contact may wish to terminate the account session once they have completed the actions or tasks requested by the managing contact, even if prior to any access limitations set by the managing contact, in order to remove any remaining responsibility with respect to the account from the guest contact.

As a further example, a termination event may be determined in response to receiving an indication that the second application 122 is closed on the second device 104. For example, closure of the second application 122 may be deemed a termination event when the permissions limit the guest contact to a particular number of accesses within an allotted time period. As an illustrative example, if the guest contact is permitted three accesses within a three day period, the closure of the second application 122 after the third access may serve as a termination event even if only one day of the three day period has elapsed. In contrast, using the same example, the closure of the second application 122 after the second access may not serve as a termination event, and the guest contact may regain access for the third time to the account session upon re-verification of their identity (e.g., upon a subsequent selection of the link in the first electronic communication as discussed above) as long as the three day time period has not elapsed and no other termination events, such as the ones described above, have occurred.

At step 216, the process 200 may include revoking the guest contact's access to the account based on the determination at step 214. After revoking the guest contact's access to the account, the guest contact may no longer be able to access the account session. For example, in response to the guest contact selecting the link and/or access-specific control element within the first electronic communication subsequent to the revocation of the guest contact's access, the second application may be reopened on the second device. However, the user interface of the second application may only include a prompt indicating that the guest contact no longer has access to the account.

In some embodiments, the account session information may be stored in association with the account (e.g., in one of data stores 118). For example, the following data may be stored: the guest contact information; the permissions initially set by the managing contact as part of the request; data associated with the identity verification (e.g., a type of the first electronic communication sent, a duration between the sending of the first electronic communication and a selection of the link, a duration between the selecting of the link and the verification, a number of total verifications performed, etc.); activity data, including a duration between the identity verification and a first access to the account, a duration between any subsequent accesses to the account, a number of accesses to the account, and actions performed; any permissions modified by the managing contact throughout the duration of the account session; and a type of termination event that occurred. As a result, a history of past accesses may be logged and used to inform future grants of access.

For example, when the managing contact subsequently requests to grant account access to a guest contact (e.g., subsequently selects the option to grant guest access to the account), a history of past accesses granted to one or more guest contacts may be displayed within a list from which the managing contact can select a guest contact from to re-grant that guest contact access. When the guest contact is re-granted access, account session information from the past accesses by the guest contact may be referenced from storage (e.g., from the data stores 118) to stream-line and/or further enhance security of the present granting process. As one example, permissions set in the previous account session may be provided as default permissions that are modifiable by the managing contact to fit the present account session, as needed. As another example, the data associated with the identity verification of the guest contact in the previous granting of access may increase confidence in the identity verification process (e.g., if the guest contact follows similar behavioral patterns as the previous access).

Accordingly, certain embodiments may be performed for granting account access to a guest contact. The process 200 described above is provided merely as an example, and may include additional, fewer, different, or differently arranged steps than depicted in FIG. 2.

FIG. 3A depicts a flowchart of an exemplary process 300 for verifying an identity of a guest contact, according to certain embodiments. In some examples, the process 300 may be performed by the guest access system 114. Process 300 may be used to perform at least a portion of an optional identity verification step of process 200 (e.g., subsequent to causing the application to open on the guest contact's device at step 210 and prior to activating the account session to provide the guest contact access to the account through the application at step 212). FIG. 3B is an exemplary conceptual diagram 350 depicting an identity verification of a guest contact (e.g., conceptualizing the process 300), according to certain embodiments.

Referring to FIG. 3A and FIG. 3B concurrently, at step 302, the process 300 may include generating a second electronic communication to enable identity verification of the guest contact that is then transmitted at step 304 of process 300. Using the contact information for the guest contact received as part of the request, the second electronic communication may be generated and transmitted in response to the guest contact's selection of the link within the first electronic communication. For example, the first electronic communication including the link may be an email that is accessed by the guest contact on the second device 104, causing the instance of the second application 122 to open on the second device 104 upon selection of the link. As illustrated in FIG. 3B, the user interface of the second application 122 may include a prompt 352 for identity verification. The prompt 352 may at least include a second communication indicator 354 to alert the guest contact to and/or provide details on the type of second communication (e.g., a text message) that has been transmitted.

In some embodiments, the type of the second electronic communication generated may be of a different type than the first electronic communication generated to provide for multi-factor authentication. For example, if the first electronic communication including the link is an email accessed by the guest contact on the second device 104 as described above, then the second electronic communication may instead be a text message, an automated phone call, or at least an email sent to a different email address obtained from the contact information. Similarly, if the first electronic communication including the link is a text message, then the second electronic communication may instead be an email or at least a text message or an automated phone call sent to a different telephone number obtained from the contact information. The second electronic communication may be transmitted to a device of the guest contact, where the particular device to which the second electronic communication is transmitted may be dependent on the type of communication generated. As shown in FIG. 3B, the second electronic communication may be a text message 362 transmitted to the third device 106 of the guest contact.

In some examples and as illustrated in the text message 362, the second electronic communication may be generated to include a pin, passcode, or other similar identifier that the guest contact must provide as part of the identity verification process. In such examples, the prompt 352 displayed on the user interface of the second application 122 may also include a verify control element 360 and information 356 requesting that the user perform one or more actions, such as to enter the identifier into a field 358 within the prompt 352, and select the verify control element 360. In other examples, the second electronic communication itself (e.g., the text message 362) may include a verify control element that, upon selection, verifies the identity of the guest contact.

Returning to FIG. 3A, at step 306, the process 300 may conclude upon receiving an indication of a user interaction associated with the second electronic communication that verifies the identity of the guest contact. When the second electronic communication includes an identifier that must be provided through the second application 122, the indication received may be the identifier input by the user via the user interface of the second application 122 on the second device 104 that corresponds to the identifier included in the second electronic communication (e.g., the text message 362). In other examples, when the second electronic communication itself (e.g., the text message 362) includes a verify control element, the indication received may be a selection of the verify element that is received from the device of the guest contact to which the second communication was transmitted (e.g., from the third device 106).

Accordingly, certain embodiments may perform identity verification of the guest contact. The process 300 described above is provided merely as an example, and may include additional, fewer, different, or differently arranged steps than depicted in FIG. 3A.

Figure 4:
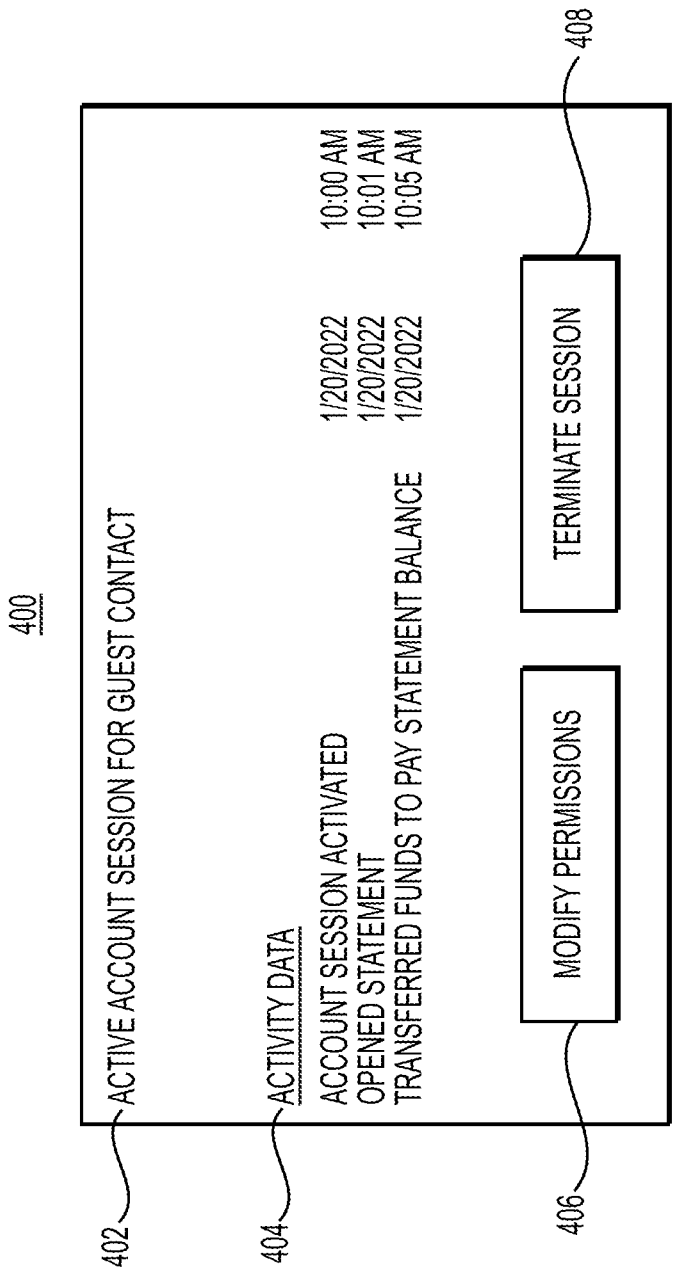
FIG. 4 depicts an exemplary application user interface for providing account session activity data and account session controls, according to certain embodiments.

FIG. 4 depicts an exemplary application user interface 400 for providing account session activity data and account session controls, according to certain embodiments. In some examples, the application user interface 400 may be at least a portion of the user interface of the first application 120 associated with the managing contact. For example, once the account session for the guest contact is activated, the application user interface 400 may be displayed as a window, menu, notification, and/or the like on an account page of the first application 120. Alternatively, the application user interface 400 may be a separate page of the first application 120 that the managing contact may access via the account page, for example. The application user interface 400 may include at least an active account session indicator 402 to indicate that the account session for the guest contact is currently active or open.

In some embodiments, the application user interface 400 may also display activity data 404 associated with the account session that is received by the guest access system 114 from the second application 122 through which the active account session is being accessed by the guest contact. The activity data 404 may include events associated with the account session, such as activation of the session, read and/or write actions performed by the guest contact during the session, periods of inactivity, closure of the session, and/or termination of the account session, among other similar examples. A timestamp associated with the event (e.g., a time and date of the event) may also be displayed in conjunction with at least a brief description or summary of the event.

Additionally, or alternatively, the application user interface 400 may include one or more control elements (e.g., buttons, check boxes, radio buttons, etc.) for causing the first application 120 to perform an action associated with the guest contact's account access, and information describing the control elements. One example control element may be a modify permissions control element 406. For example, upon selection of the modify permissions control element 406, a window, menu, or other similar graphical display element may be displayed to allow the managing contact to modify and/or delete one or more of the existing permissions included as part of the managing contact's request to grant access, and/or add one or more new permissions. The guest access system 114 may modify the account session accordingly. Another example control element may be a terminate session control element 408. For example, upon selection of the terminate session control element 408, the guest access system 114 may terminate the account session to revoke the guest contact's access to the account.

The application user interface 400 described above is provided merely as an example, and may include additional, fewer, different, or differently arranged information and/or interactive control elements than depicted in FIG. 4.

Figure 3:
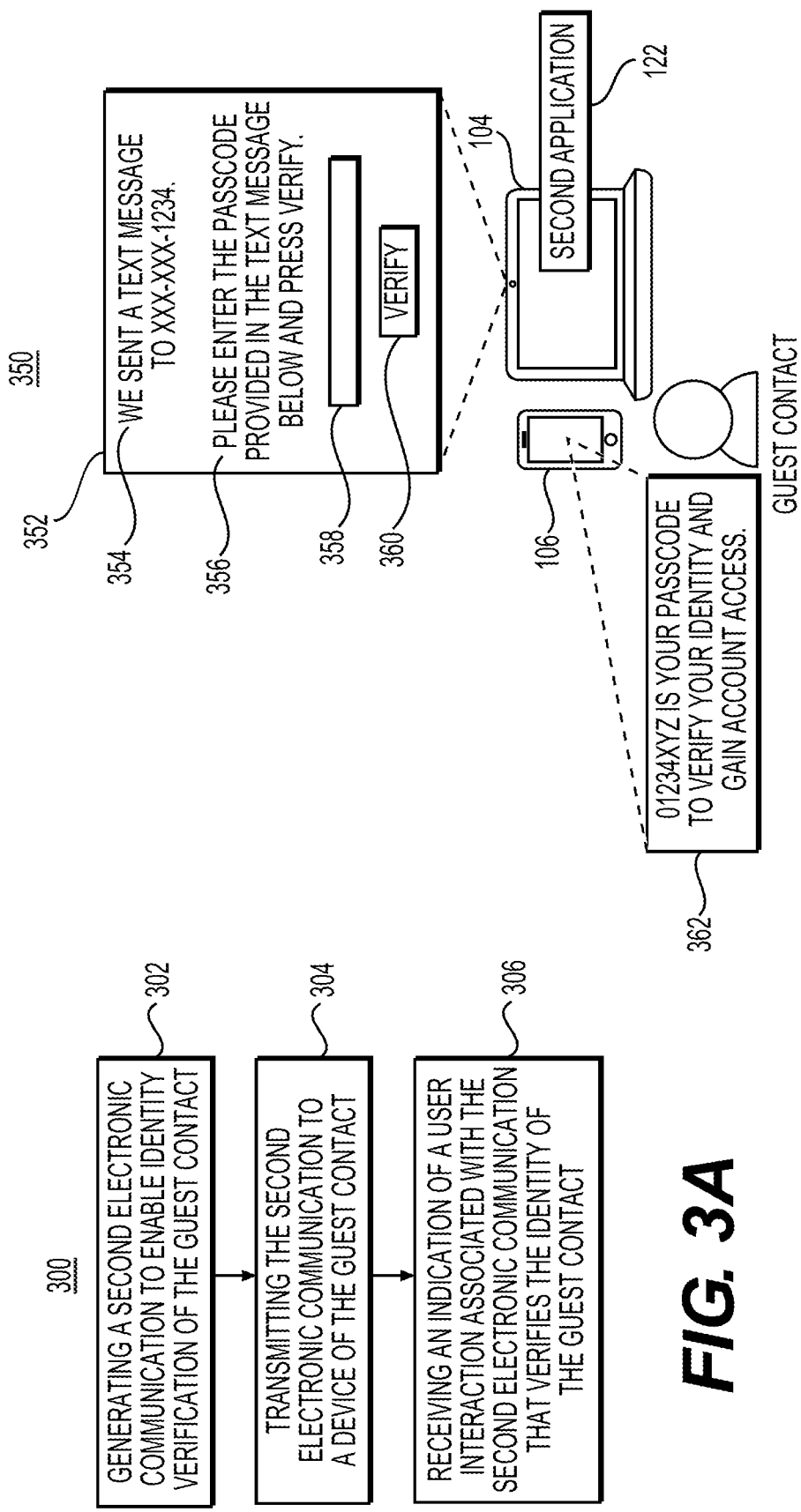
FIG. 3A depicts a flowchart of an exemplary process for verifying an identity of a guest contact, according to certain embodiments.
FIG. 3B is an exemplary conceptual diagram depicting an identity verification of a guest contact, according to certain embodiments.

In general, any process or operation discussed in this disclosure that is understood to be computer-implementable, such as the processes or operations depicted in FIGS. 2-4, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

FIG. 5 depicts an example of a computer 500, according to certain embodiments. FIG. 5 is a simplified functional block diagram of a computer 500 that may be configured as a device for executing processes or operations depicted in, or described with respect to, FIGS. 2-4, according to exemplary embodiments of the present disclosure. For example, the computer 500 may be configured as one of the first device 102, second device 104, or third device 106, one of the server-side systems 110, and/or another device according to exemplary embodiments of this disclosure. In various embodiments, any of the systems herein may be a computer 500 including, e.g., a data communication interface 520 for packet data communication. The computer 500 may communicate with one or more other computers 500 using the electronic network 525. The electronic network 525 may include a wired or wireless network similar to the network 108 depicted in FIG. 1.

The computer 500 also may include a central processing unit ("CPU"), in the form of one or more processors 502, for executing program instructions 524. The program instructions 524 may include instructions for running the first application 120 (e.g., if the computer 500 is the first device 102) or the second application 122 (e.g. if the computer 500 is the second device 104). The program instructions 524 may include instructions for running one or more operations of the respective server-side systems 110 (e.g., if the computer 500 is one of the respective server-side systems 110). The computer 500 may include an internal communication bus 508, and a drive unit 506 (such as read-only memory (ROM), hard disk drive (HDD), solid-state disk drive (SDD), etc.) that may store data on a computer readable medium 522, although the computer 500 may receive programming and data via network communications. The computer 500 may also have a memory 504 (such as random access memory (RAM)) storing instructions 524 for executing techniques presented herein, although the instructions 524 may be stored temporarily or permanently within other modules of computer 500 (e.g., processor 502 and/or computer readable medium 522). The computer 500 also may include user input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another . . . . Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for granting account access to a guest contact, comprising:
   receiving, from a first application executing on a first device and associated with a managing contact of an account, a request from the managing contact to grant a guest contact access to the account, the request including contact information for the guest contact;
   determining, from a stored history of past accesses granted by the managing contact to one or more quest contacts that have since been revoked, the guest contact identified by the request was granted a past access to the account by the managing contact;
   providing, via a user interface of the first application, one or more previous permissions for a previous account session associated with the past access to the account as one or more default permissions for selection or modification by the managing contact;
   receiving, from the first application, as one or more permissions associated with the access to the account by the quest contact, one or more selected default permissions or one or more modified default permissions:
   generating an account session for the guest contact based on the contact information and the one or more permissions;
   generating a first electronic communication that includes a link to a second application to provide the guest contact access to the account session;
   transmitting the first electronic communication to a second device of the guest contact;
   causing the second application to open on the second device upon a selection of the link, a user interface of the second application including a prompt for identity verification;
   upon identity verification, activating the account session to provide the guest contact access to the account through the second application, wherein the second application providing the quest contact access to the account includes only a subset of features and functionalities of the first application via which the managing contact accesses the account, the subset defined based on the one or more permissions to constrain actions performable by the quest contact;
   determining an occurrence of a termination event associated with the account session; and
   revoking the guest contact's access to the account based on the determination.

2. The computer-implemented method of claim 1, wherein receiving the contact information for the guest contact comprises:
   receiving contact information automatically extracted by the first application from a contacts list associated with the first device.

3. The computer-implemented method of claim 1, wherein the one or more permissions include one or more of a type of access, a time period allotted for the guest contact to have access, or a particular number of accesses.

4. The computer-implemented method of claim 1, further comprising:
   upon the selection of the link, generating, using the contact information, a second electronic communication, wherein the second electronic communication is of a same type or a different type of communication than the first electronic communication;

transmitting the second electronic communication to at least one of the second device or a third device of the guest contact; and receiving an indication of a user interaction associated with the second electronic communication verifying the identity of the guest contact.

5. The computer-implemented method of claim 1, wherein determining the occurrence of the termination event comprises one of:

receiving, from the first application, a request from the managing contact to terminate the account session;

receiving, from the second application, a request from the guest contact to terminate the account session;

receiving, from the second application, an indication that the second application is closed on the second device;

receiving, from the second application, an indication that the guest contact closed the second application after a particular number of accesses defined by the one or more permissions is reached; or detecting an expiry of a time period for access defined by the one or more permissions.

6. The computer-implemented method of claim 1, further comprising:

receiving, from the second application, activity data associated with the account session; and providing the activity data to the first application for display to the managing contact of the account.

7. The computer-implemented method of claim 1, further comprising:

receiving, from the first application, a request to modify at least one of the one or more permissions; and in response to the request, modifying the account session in accordance with the at least one of the one or more permissions modified.

8. The computer-implemented method of claim 1, further comprising:

prior to determining an occurrence of a termination event associated with the account session, causing the second application to reopen on the second device upon a subsequent selection of the link, the user interface of the second application including the prompt for identity verification; and upon identity verification, reactivating the account session to provide the guest contact access to the account through the second application.

9. The computer-implemented method of claim 1, further comprising:

after revoking the guest contact's access to the account, causing the second application to reopen on the second device upon a subsequent selection of the link, the user interface of the second application including a prompt indicating that the guest contact no longer has access to the account.

10. The computer-implemented method of claim 1, wherein activating the account session further comprises providing the guest contact access to the account through the second application without the guest contact having to establish a new account or establish credentials unique to the guest contact for the account.

11. The computer-implemented method of claim 1, further comprising:

in response to receiving an indication of the request to grant the guest contact access to the account, accessing the stored history of past accesses granted by the managing contact to one or more guest contacts that have since been revoked; and providing, via the user interface of the first application, a list of the one or more guest contacts that were granted a past access to the account by the managing contact, wherein the guest contact included in the request is selected from the list to enable a re-grant of access to the account.

12. The computer-implemented method of claim 1, wherein the first electronic communication further includes an access-specific control element and the link, and activating the account session further comprises:

upon the identity verification, causing display of a prompt in the user interface of the second application, the prompt indicating the guest contact was verified and instructing the guest contact to select the access-specific control element to gain access to the account; and waiting to activate the account session until a selection of the access-specific control element from the first electronic communication is received.

13. The computer-implemented method of claim 1, further comprising:

receiving, from the stored history of past accesses, data associated with an identity verification of the guest contact in the past access, wherein the data is compared to guest contact behavior associated with an identity verification performed to enable a re-grant of access to the account.

14. A system for granting account access to a guest contact, comprising:

at least one memory storing instructions; and at least one processor operatively connected to the at least one memory and configured to execute the instructions to perform operations, including:

receiving, from a first application executing on a first device and associated with a managing contact of an account, an indication of a request from the managing contact to grant access to the account;

accessing a stored history of past accesses granted by the managing contact to one or more guest contacts that have since been revoked;

providing, via a user interface of the first application, a list of the one or more guest contacts that were granted a past access to the account by the managing contact, wherein a guest contact is selected from the list to enable a re-grant of access to the account;

receiving, from the first application, the request including contact information for the guest contact and one or more permissions associated with the access to the account by the guest contact;

generating an account session for the guest contact based on the contact information and the one or more permissions;

generating a first electronic communication that includes a link to a second application to provide the guest contact access to the account session;

transmitting the first electronic communication to a second device of the guest contact;

causing the second application to open on the second device upon selection of the link, a user interface of the second application including a prompt for identity verification;

upon identity verification, activating the account session to provide the guest contact access to the account through the second application, wherein the second application providing the guest contact access to the account includes only a subset of features and functionalities of the first application via which the managing contact accesses the account, the subset defined based on the one or more permissions to constrain actions performable by the quest contact;

determining an occurrence of a termination event associated with the account session; and revoking the guest contact's access to the account based on the determination.

15. The system of claim 14, wherein the contact information includes at least one of a telephone number or an electronic mail address of the guest contact, and the one or more permissions include one or more of a type of access, a time period allotted for the guest contact to have access, or a particular number of accesses.

16. The system of claim 14, wherein determining the occurrence of the termination event comprises one of:

receiving, from the first application, a request from the managing contact to terminate the account session;

receiving, from the second application, a request from the guest contact to terminate the account session;

receiving, from the second application, an indication that the guest contact closed the second application;

receiving, from the second application, an indication that the guest contact closed the second application after a particular number of accesses defined by the one or more permissions is reached; or detecting an expiry of a time period for access defined by the one or more permissions.

17. The system of claim 14, the operations further comprising:

receiving, from the second application, activity data associated with the account session; and providing the activity data to the first application for display to the managing contact of the account.

18. The system of claim 14, the operations further comprising:

receiving, from the first application, a request to modify at least one of the one or more permissions; and in response to the request, modifying the account session in accordance with the at least one of the one or more permissions modified.

19. A computer-implemented method for granting account access to a guest contact, comprising:

receiving, from a first application executing on a first device and associated with a managing contact of an account, a request from the managing contact to grant a guest contact access to the account, the request including contact information for the guest contact and one or more permissions associated with the access to the account by the guest contact;

determining, from a stored history of past accesses granted by the managing contact to one or more guest contacts that have since been revoked, the quest contact identified by the request was granted a past access to the account by the managing contact;

receiving, from the stored history of past accesses, data associated with an identity verification of the guest contact in the past access;

generating an account session for the guest contact based on the contact information and the one or more permissions;

generating a first electronic communication that includes a link to a second application to provide the guest contact access to the account session;

transmitting the first electronic communication to a second device of the guest contact;

causing the second application to open on the second device upon a selection of the link, a user interface of the second application including a prompt for identity verification;

comparing the data associated with the identity verification of the quest contact in the past access with guest contact behavior associated with the identity verification to enable a re-grant of access to the account;

upon the identity verification, activating the account session to provide the guest contact access to the account through the second application, wherein the second application providing the quest contact access to the account includes only a subset of features and functionalities of the first application via which the managing contact accesses the account, the subset defined based on the one or more permissions to constrain actions performable by the guest contact;

receiving, from the second application, activity data associated with the account session;

providing the activity data to the first application for display, the activity data displayed on a user interface of the first application along with one or more controls for one or more of modifying the one or more permissions or terminating the account session;

determining an occurrence of a termination event associated with the account session; and revoking the guest contact's access to the account based on the determination.

* * * * *